United States Patent
Wang et al.

(10) Patent No.: US 7,817,718 B2
(45) Date of Patent: *Oct. 19, 2010

(54) MACROBLOCK LEVEL ADAPTIVE FRAME/FIELD CODING FOR DIGITAL VIDEO CONTENT

(75) Inventors: Limin Wang, San Diego, CA (US); Rajeev Gandhi, San Diego, CA (US); Krit Panusopone, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/027,869

(22) Filed: Dec. 30, 2004

(65) Prior Publication Data

US 2005/0147169 A1    Jul. 7, 2005

Related U.S. Application Data

(62) Division of application No. 10/301,290, filed on Nov. 20, 2002, now Pat. No. 6,980,596.

(60) Provisional application No. 60/333,921, filed on Nov. 27, 2001, provisional application No. 60/395,734, filed on Jul. 12, 2002, provisional application No. 60/398,161, filed on Jul. 23, 2002.

(51) Int. Cl.
*H04B 1/66* (2006.01)

(52) U.S. Cl. ............................ 375/240.16; 375/240.15; 375/240.25; 375/240.26; 375/240.14; 375/240.12; 348/699; 382/233; 382/235; 382/238; 382/236

(58) Field of Classification Search ............ 375/240.16, 375/240.15, 240.25, 240.26, 240.14, 240.12; 348/699; 382/233, 235, 238, 236
See application file for complete search history.

(56) References Cited

U.S. PATENT DOCUMENTS

| | | | |
|---|---|---|---|
| 4,437,119 A | | 3/1984 | Matsumoto et al. |
| 5,412,428 A | | 5/1995 | Tahara |
| 5,504,530 A | * | 4/1996 | Obikane et al. ........ 375/240.14 |
| 5,801,778 A | | 9/1998 | Ju |
| 6,094,225 A | | 7/2000 | Han |
| 6,192,146 B1 | | 2/2001 | Lin |
| 6,404,813 B1 | | 6/2002 | Haskell et al. |

OTHER PUBLICATIONS

"Core Experiment on Interlaced Video Coding", Peter Borgwart, VideoTele.com—A Tektronix Company, Study Group 16, Question 6.

(Continued)

*Primary Examiner*—Shawn An
(74) *Attorney, Agent, or Firm*—Larry T. Cullen

(57) ABSTRACT

A method and system of encoding and decoding digital video content. The digital video content comprises a stream of pictures which can each be intra, predicted, or bi-predicted pictures. Each of the pictures comprises macroblocks that can be further divided into smaller blocks. The method entails encoding and decoding each of the smaller blocks in each picture in said stream of pictures in either frame mode or in field mode.

12 Claims, 8 Drawing Sheets

OTHER PUBLICATIONS

"Adaptive field/frame block coding experiment proposal", Interested Parties for the Study of Interlaced Video Coding with H.26L, Video Coding Experts Group, Study Group 16.

P. Borgwardt: "Core Experiment on Interlaced Video Coding VCEG-N85" ITU-Telecommunications Standardization Sector ITU-T Q.6/SG16 Video Coding Expert Group (VCEG) Sep. 24-27, 2001, pp. 1-10, XP002257037 Santa Barbara, CA USA.

"H.26L Test Model Long Term No. 8 (TML-8) Drafto" ITU-T Telecommunicatoin Standardization Sector of ITU, Geneva, CH, Apr. 2, 2001, pp. 1-54, XP001069814 p. 9, paragraph 1-p. 10, paragraph 6.1.2.2.1 p p. 40.

P. Borgwardt: "Handling Interlaced Video in H.26L VCEG-N57" ITU-Telecommunications Standardization Sector ITU Q.6/SG16 Video Coding Expert Group (VCEG), Sep. 24-27, 2001, pp. 1-3, XP002257142 Santa Barbara, CA USA.

M. Gallant et al: High Rate, High Resolution Video Using H.26L VCEG-N84 ITU-Telecommunications Standardization Secotr ITU Q.6/SG16 Video Coding Expert Group (VCEG), Sep. 24-27, 2001, pp. 1-7, XP002257143 Santa Barbara, CA USA; p. 1: p. 3.

"Adaptive Field/Frame Block Coding Experiment Proposal" Interested Parties for the Study of Interfaced Video Coding With H.26L, Video Coding Experts Group, Study Group 16, VCEG N-76, ITU-Telecommunications Standardization Sector ITU-T Q.6/SG16, Sep. 24-27, 2001, pp. 1-7, XP002257036, Santa Barbara, CA.

* cited by examiner

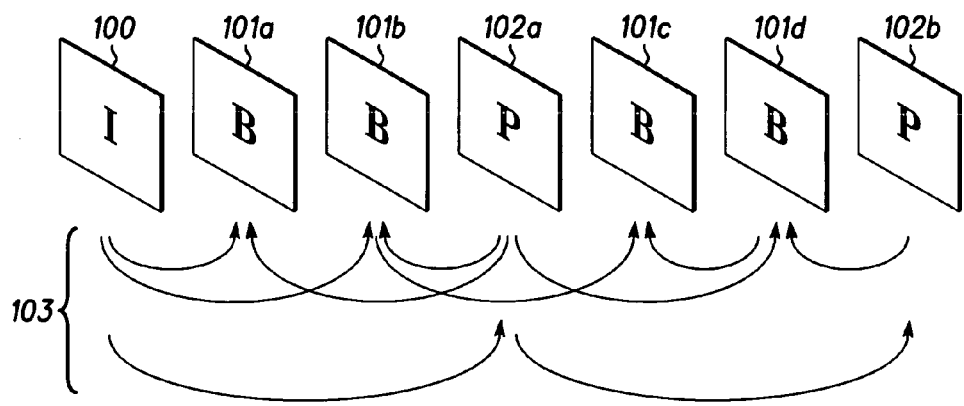
FIG. 1
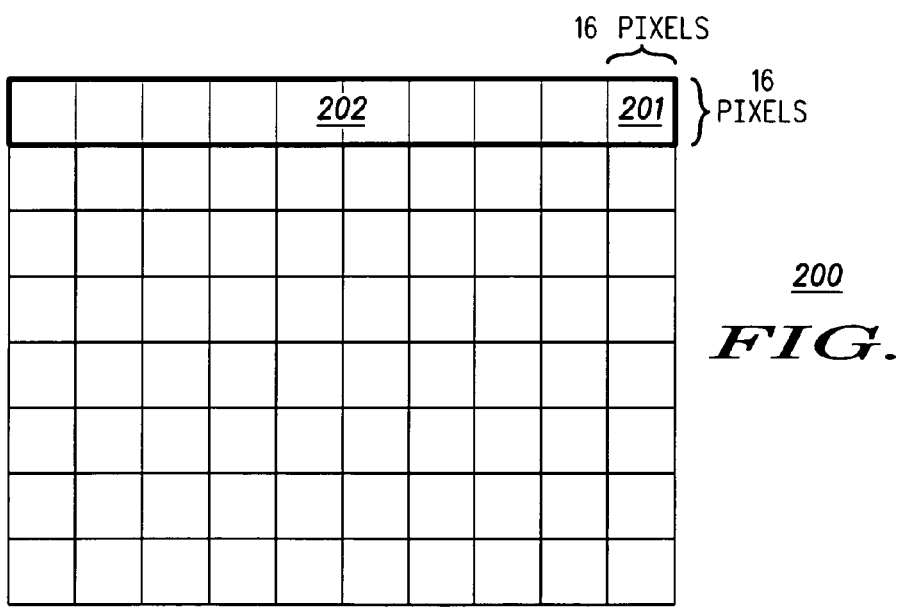
FIG. 2
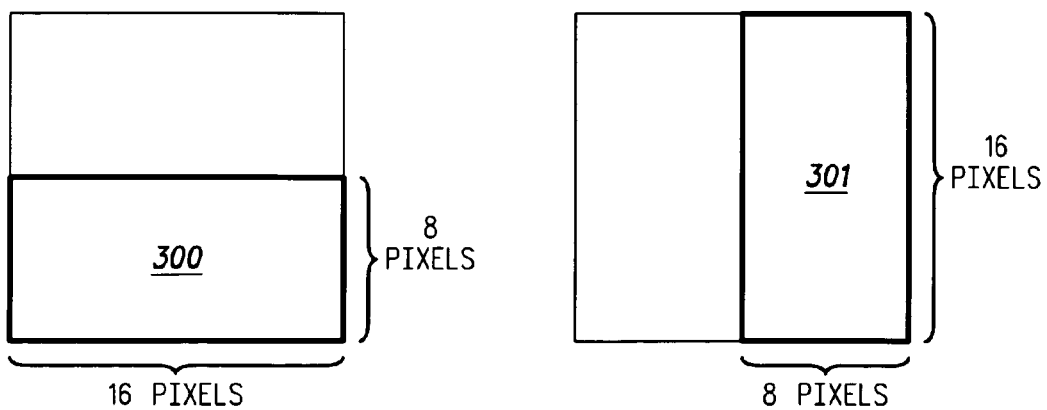
FIG. 3A          FIG. 3B

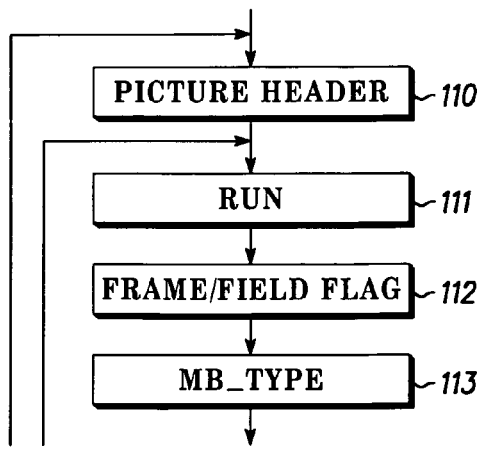
FIG. 11
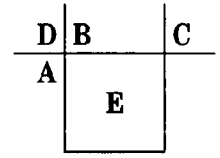
FIG. 12
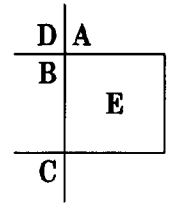
FIG. 13
FIG. 14
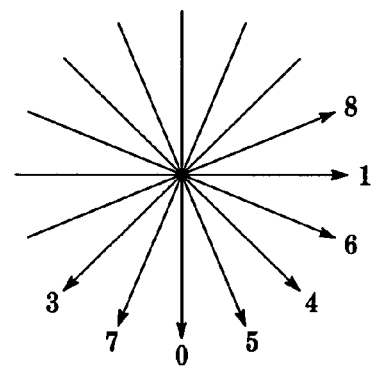
FIG. 15
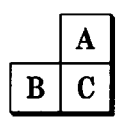
FIG. 16A  FIG. 16B

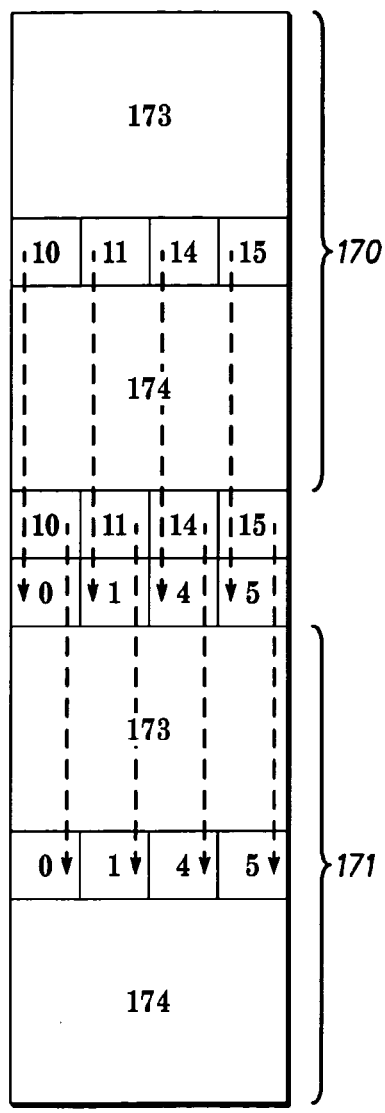
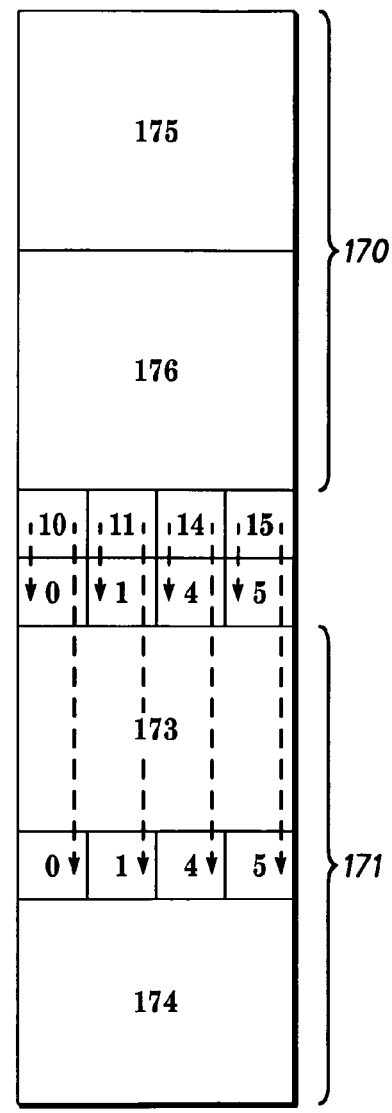
FIG. 17A   FIG. 17B

MACROBLOCK LEVEL ADAPTIVE FRAME/FIELD CODING FOR DIGITAL VIDEO CONTENT

The present application claims priority under 35 U.S.C. §119(e) from the following previously filed Provisional Patent Application Ser. No. 60/333,921, filed Nov. 27, 2001; Ser. No. 60/395,734, filed Jul. 12, 2002; Ser. No. 60/398,161, filed Jul. 23, 2002; all of which are herein incorporated by reference. This application is also a Divisional of U.S. patent application Ser. No. 10/301,290 filed on Nov. 20, 2002, now U.S. Pat. No. 6,980,596 which is herein incorporated by reference.

TECHNICAL FIELD

The present invention relates to encoding and decoding of digital video content. More specifically, the present invention relates to frame mode and field mode encoding of digital video content at a macroblock level as used in the MPEG-4 Part 10 AVC/H.264 standard video coding standard.

BACKGROUND

Video compression is used in many current and emerging products. It is at the heart of digital television set-top boxes (STBs), digital satellite systems (DSSs), high definition television (HDTV) decoders, digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed.

The digital video content comprises a stream of pictures that can be displayed as an image on a television receiver, computer monitor, or some other electronic device capable of displaying digital video content. A picture that is displayed in time before a particular picture is in the "backward direction" in relation to the particular picture. Likewise, a picture that is displayed in time after a particular picture is in the "forward direction" in relation to the particular picture.

Video compression is accomplished in a video encoding, or coding, process in which each picture is encoded as either a frame or as two fields. Each frame comprises a number of lines of spatial information. For example, a typical frame contains 480 horizontal lines. Each field contains half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereafter and in the appended claims, unless otherwise specifically denoted. Likewise, the field that comprises the even numbered lines will be referred to as the "bottom" field hereafter and in the appended claims, unless otherwise specifically denoted. The two fields can be interlaced together to form an interlaced frame.

The general idea behind video coding is to remove data from the digital video content that is "non-essential." The decreased amount of data then requires less bandwidth for broadcast or transmission. After the compressed video data has been transmitted, it must be decoded, or decompressed. In this process, the transmitted video data is processed to generate approximation data that is substituted into the video data to replace the "non-essential" data that was removed in the coding process.

Video coding transforms the digital video content into a compressed form that can be stored using less space and transmitted using less bandwidth than uncompressed digital video content. It does so by taking advantage of temporal and spatial redundancies in the pictures of the video content. The digital video content can be stored in a storage medium such as a hard drive, DVD, or some other non-volatile storage unit.

There are numerous video coding methods that compress the digital video content. Consequently, video coding standards have been developed to standardize the various video coding methods so that the compressed digital video content is rendered in formats that a majority of video encoders and decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H261, and ITU-T H263 standards.

Most modern video coding standards, such as those developed by MPEG and ITU-T, are based in part on a temporal prediction with motion compensation (MC) algorithm. Temporal prediction with motion compensation is used to remove temporal redundancy between successive pictures in a digital video broadcast.

The temporal prediction with motion compensation algorithm typically utilizes one or two reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm. One of the reference pictures may be in the backward direction in relation to the particular picture that is to be encoded. The other reference picture is in the forward direction in relation to the particular picture that is to be encoded.

However, as the demand for higher resolutions, more complex graphical content, and faster transmission time increases, so does the need for better video compression methods. To this end, a new video coding standard is currently being developed jointly by ISO and ITU-T. This new video coding standard is called the MPEG-4 Advanced Video Coding (AVC)/H.264 standard.

SUMMARY OF THE INVENTION

In one of many possible embodiments, the present invention provides a method of encoding, decoding, and bitstream generation of digital video content. The digital video content comprises a stream of pictures which can each be intra, predicted, or bi-predicted pictures. Each of the pictures comprises macroblocks that can be further divided into smaller blocks. The method entails encoding and decoding each of the macroblocks in each picture in said stream of pictures in either frame mode or in field mode.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

FIG. 1 illustrates an exemplary sequence of three types of pictures that can be used to implement the present invention, as defined by an exemplary video coding standard such as the MPEG-4 Part 10 AVC/H.264 standard.

FIG. 2 shows that each picture is preferably divided into slices containing macroblocks according to an embodiment of the present invention.

FIG. 3a shows that a macroblock can be further divided into a block size of 16 by 8 pixels according to an embodiment of the present invention.

FIG. 3b shows that a macroblock can be further divided into a block size of 8 by 16 pixels according to an embodiment of the present invention.

FIG. 11 shows some of the information included in the bitstream which contains information pertinent to each macroblock within a stream.

FIG. 12 shows a block that is to be encoded and its neighboring blocks and will be used to explain various preferable methods of calculating the PMV of a block in a macroblock.

FIG. 13 shows an alternate definition of neighboring blocks if the scanning path is a vertical scanning path.

FIG. 14 shows that each pixel value is predicted from neighboring blocks' pixel values according to an embodiment of the present invention.

FIG. 15 shows different prediction directions for intra_ 4×4 coding.

FIGS. 16a-b illustrate that the chosen intra-prediction mode (intra_pred_mode) of a 4 by 4 pixel block is highly correlated with the prediction modes of adjacent blocks.

FIGS. 17a-d show neighboring blocks definitions in relation to a current macroblock pair that is to be encoded.

Throughout the drawings, identical reference numbers designate similar, but not necessarily identical, elements.

DETAILED DESCRIPTION OF EMBODIMENTS OF THE INVENTION

Figure 3C:
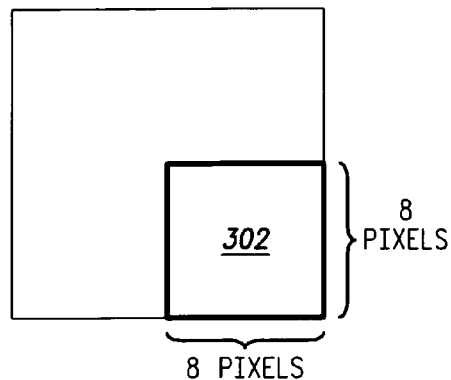
FIG. 3c shows that a macroblock can be further divided into a block size of 8 by 8 pixels according to an embodiment of the present invention.
Figure 3D:
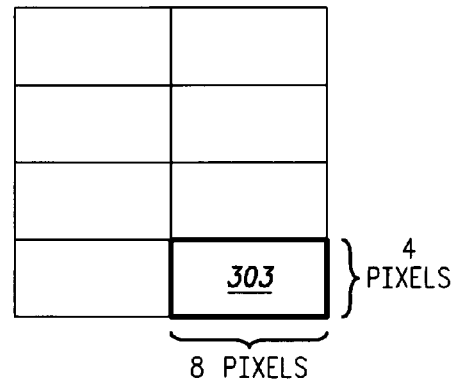
FIG. 3d shows that a macroblock can be further divided into a block size of 8 by 4 pixels according to an embodiment of the present invention.
Figure 3E:
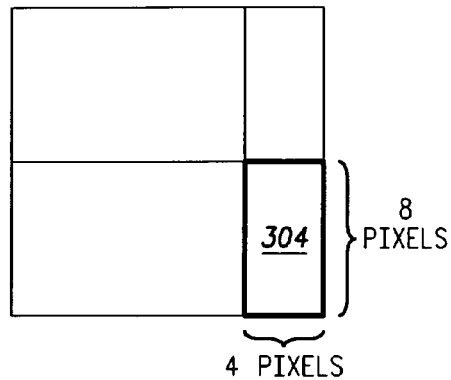
FIG. 3e shows that a macroblock can be further divided into a block size of 4 by 8 pixels according to an embodiment of the present invention.

The present invention provides a method of adaptive frame/field (AFF) coding of digital video content comprising a stream of pictures or slices of a picture at a macroblock level. The present invention extends the concept of picture level AFF to macroblocks. In AFF coding at a picture level, each picture in a stream of pictures that is to be encoded is encoded in either frame mode or in field mode, regardless of the frame or field coding mode of other pictures that are to be coded. If a picture is encoded in frame mode, the two fields that make up an interlaced frame are coded jointly. Conversely, if a picture is encoded in field mode, the two fields that make up an interlaced frame are coded separately. The encoder determines which type of coding, frame mode coding or field mode coding, is more advantageous for each picture and chooses that type of encoding for the picture. The exact method of choosing between frame mode and field mode is not critical to the present invention and will not be detailed herein.

As noted above, the MPEG-4 Part 10 AVC/H.264 standard is a new standard for encoding and compressing digital video content. The documents establishing the MPEG-4 Part 10 AVC/H.264 standard are hereby incorporated by reference, including "Joint Final Committee Draft (JFCD) of Joint Video Specification" issued by the Joint Video Team (JVT) on Aug. 10, 2002. (ITU-T Rec. H.264 & ISO/IEC 14496-10 AVC). The JVT consists of experts from ISO or MPEG and ITU-T. Due to the public nature of the MPEG-4 Part 10 AVC/H.264 standard, the present specification will not attempt to document all the existing aspects of MPEG-4 Part 10 AVC/H.264 video coding, relying instead on the incorporated specifications of the standard.

Although this method of AFF encoding is compatible with and will be explained using the MPEG-4 Part 10 AVC/H.264 standard guidelines, it can be modified and used as best serves a particular standard or application.

Using the drawings, the preferred embodiments of the present invention will now be explained.

FIG. 1 illustrates an exemplary sequence of three types of pictures that can be used to implement the present invention, as defined by an exemplary video coding standard such as the MPEG-4 Part 10 AVC/H.264 standard. As previously mentioned, the encoder encodes the pictures and the decoder decodes the pictures. The encoder or decoder can be a processor, application specific integrated circuit (ASIC), field programmable gate array (FPGA), coder/decoder (CODEC), digital signal processor (DSP), or some other electronic device that is capable of encoding the stream of pictures. However, as used hereafter and in the appended claims, unless otherwise specifically denoted, the term "encoder" will be used to refer expansively to all electronic devices that encode digital video content comprising a stream of pictures. The term "decoder" will be used to refer expansively to all electronic devices that decode digital video content comprising a stream of pictures.

As shown in FIG. 1, there are preferably three types of pictures that can be used in the video coding method. Three types of pictures are defined to support random access to stored digital video content while exploring the maximum redundancy reduction using temporal prediction with motion compensation. The three types of pictures are intra (I) pictures (100), predicted (P) pictures (102a,b), and bi-predicted (B) pictures (101a-d). An I picture (100) provides an access point for random access to stored digital video content and can be encoded only with slight compression. Intra pictures (100) are encoded without referring to reference pictures.

A predicted picture (102a,b) is encoded using an I, P, or B picture that has already been encoded as a reference picture. The reference picture can be in either the forward or backward temporal direction in relation to the P picture that is being encoded. The predicted pictures (102a,b) can be encoded with more compression than the intra pictures (100).

A bi-predicted picture (101a-d) is encoded using two temporal reference pictures: a forward reference picture and a backward reference picture. The forward reference picture is sometimes called a past reference picture and the backward reference picture is sometimes called a future reference picture. An embodiment of the present invention is that the forward reference picture and backward reference picture can be in the same temporal direction in relation to the B picture that is being encoded. Bi-predicted pictures (101a-d) can be encoded with the most compression out of the three picture types.

Reference relationships (103) between the three picture types are illustrated in FIG. 1. For example, the P picture (102a) can be encoded using the encoded I picture (100) as its reference picture. The B pictures (101a-d) can be encoded using the encoded I picture (100) or the encoded P picture (102a) as its reference pictures, as shown in FIG. 1. Under the principles of an embodiment of the present invention, encoded B pictures (101a-d) can also be used as reference pictures for other B pictures that are to be encoded. For example, the B picture (101c) of FIG. 1 is shown with two other B pictures (101b and 101d) as its reference pictures.

The number and particular order of the I (100), B (101a-d), and P (102a,b) pictures shown in FIG. 1 are given as an exemplary configuration of pictures, but are not necessary to implement the present invention. Any number of I, B, and P pictures can be used in any order to best serve a particular application. The MPEG-4 Part 10 AVC/H.264 standard does not impose any limit to the number of B pictures between two reference pictures nor does it limit the number of pictures between two I pictures.

FIG. 2 shows that each picture (200) is preferably divided into slices (202). A slice (202) comprises a group of macroblocks (201). A macroblock (201) is a rectangular group of pixels. As shown in FIG. 2, a preferable macroblock (201) size is 16 by 16 pixels.

Figure 3F:
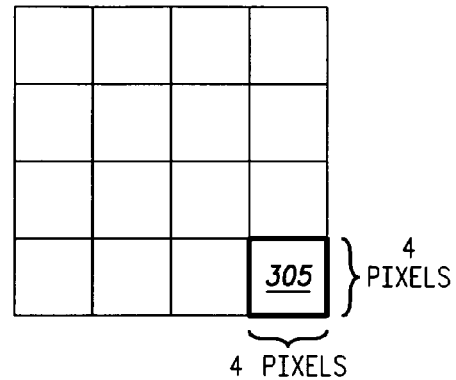
FIG. 3f shows that a macroblock can be further divided into a block size of 4 by 4 pixels according to an embodiment of the present invention.

FIGS. 3a-f show that a macroblock can be further divided into smaller sized blocks. For example, as shown in FIGS. 3a-f, a macroblock can be further divided into block sizes of 16 by 8 pixels (FIG. 3a; 300), 8 by 16 pixels (FIG. 3b; 301), 8 by 8 pixels (FIG. 3c; 302), 8 by 4 pixels (FIG. 3d; 303), 4 by 8 pixels (FIG. 3e; 304), or 4 by 4 pixels (FIG. 3f; 305). These smaller block sizes are preferable in some applications that use the temporal prediction with motion compensation algorithm.

Figure 4:
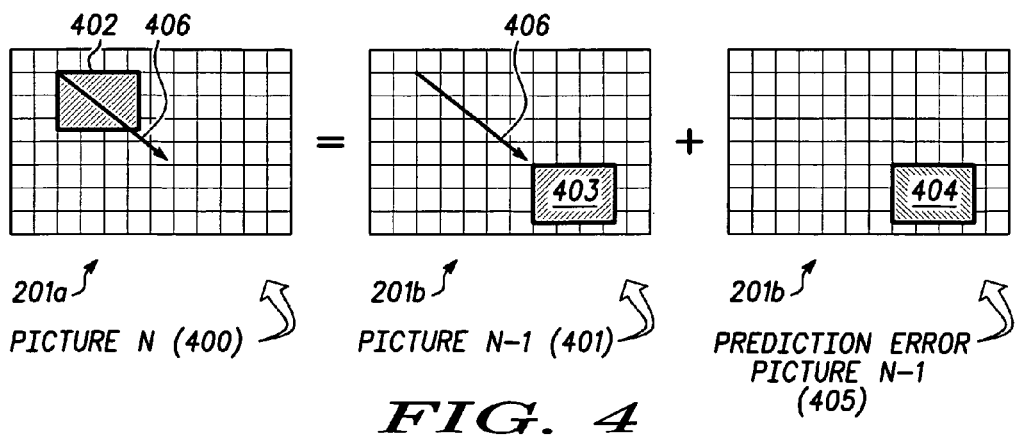
FIG. 4 shows a picture construction example using temporal prediction with motion compensation that illustrates an embodiment of the present invention.

FIG. 4 shows a picture construction example using temporal prediction with motion compensation that illustrates an embodiment of the present invention. Temporal prediction with motion compensation assumes that a current picture, picture N (400), can be locally modeled as a translation of another picture, picture N−1(401). The picture N−1(401) is the reference picture for the encoding of picture N (400) and can be in the forward or backwards temporal direction in relation to picture N (400).

As shown in FIG. 4, each picture is preferably divided into slices containing macroblocks (201a,b). The picture N−1 (401) contains an image (403) that is to be shown in picture N (400). The image (403) will be in a different temporal position in picture N (402) than it is in picture N−1(401), as shown in FIG. 4. The image content of each macroblock (201b) of picture N (400) is predicted from the image content of each corresponding macroblock (201a) of picture N−1(401) by estimating the required amount of temporal motion of the image content of each macroblock (201a) of picture N−1 (401) for the image (403) to move to its new temporal position (402) in picture N (400). Instead of the original image (402) being encoded, the difference (404) between the image (402) and its prediction (403) is actually encoded and transmitted.

For each image (402) in picture N (400), the temporal prediction can often be described by motion vectors that represent the amount of temporal motion required for the image (403) to move to a new temporal position in the picture N (402). The motion vectors (406) used for the temporal prediction with motion compensation need to be encoded and transmitted.

FIG. 4 shows that the image (402) in picture N (400) can be represented by the difference (404) between the image and its prediction and the associated motion vectors (406). The exact method of encoding using the motion vectors can vary as best serves a particular application and can be easily implemented by someone who is skilled in the art.

To understand macroblock level AFF coding, a brief overview of picture level AFF coding of a stream of pictures will now be given. A frame of an interlaced sequence contains two fields, the top field and the bottom field, which are interleaved and separated in time by a field period. The field period is half the time of a frame period. In picture level AFF coding, the two fields of an interlaced frame can be coded jointly or separately. If they are coded jointly, frame mode coding is used. Conversely, if the two fields are coded separately, field mode coding is used.

Fixed frame/field coding, on the other hand, codes all the pictures in a stream of pictures in one mode only. That mode can be frame mode or it can be field mode. Picture level AFF is preferable to fixed frame/field coding in many applications because it allows the encoder to chose which mode, frame mode or field mode, to encode each picture in the stream of pictures based on the contents of the digital video material. AFF coding results in better compression than does fixed frame/field coding in many applications.

An embodiment of the present invention is that AFF coding can be performed on smaller portions of a picture. This small portion can be a macroblock, a pair of macroblocks, or a group of macroblocks. Each macroblock, pair of macroblocks, or group of macroblocks or slice is encoded in frame mode or in field mode, regardless of how the other macroblocks in the picture are encoded. AFF coding in each of the three cases will be described in detail below.

In the first case, AFF coding is performed on a single macroblock. If the macroblock is to be encoded in frame mode, the two fields in the macroblock are encoded jointly. Once encoded as a frame, the macroblock can be further divided into the smaller blocks of FIGS. 3a-f for use in the temporal prediction with motion compensation algorithm.

Figure 5:
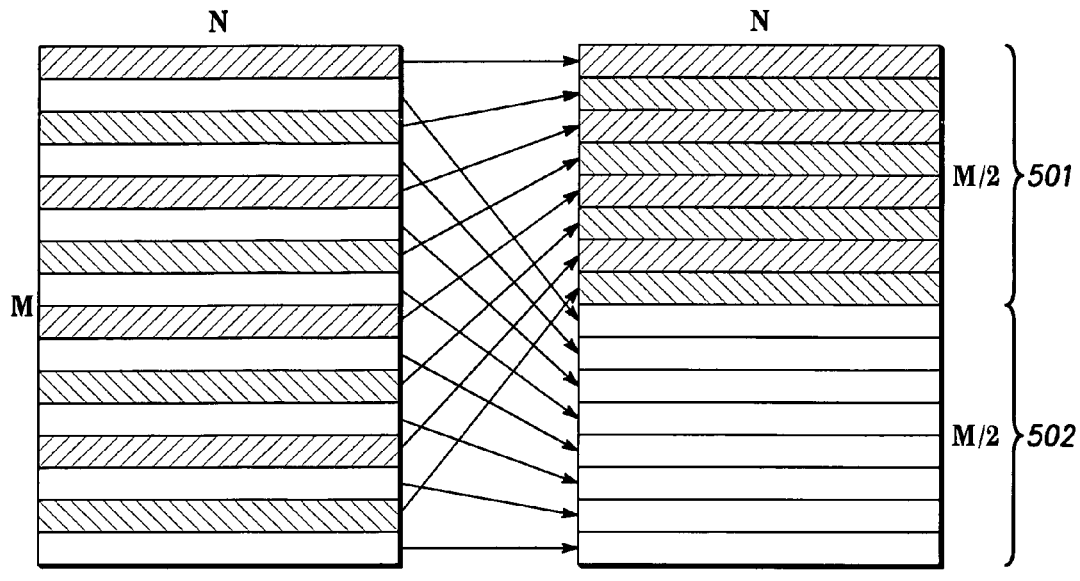
FIG. 5 shows that a macroblock is split into a top field and a bottom field if it is to be encoded in field mode.

However, if the macroblock is to be encoded in field mode, the macroblock (500) is split into a top field (501) and a bottom field (502), as shown in FIG. 5. The two fields are then coded separately. In FIG. 5, the macroblock has M rows of pixels and N columns of pixels. A preferable value of N and M is 16, making the macroblock (500) a 16 by 16 pixel macroblock. As shown in FIG. 5, every other row of pixels is shaded. The shaded areas represent the rows of pixels in the top field of the macroblock (500) and the unshaded areas represent the rows of pixels in the bottom field of the macroblock (500).

Figure 6A:
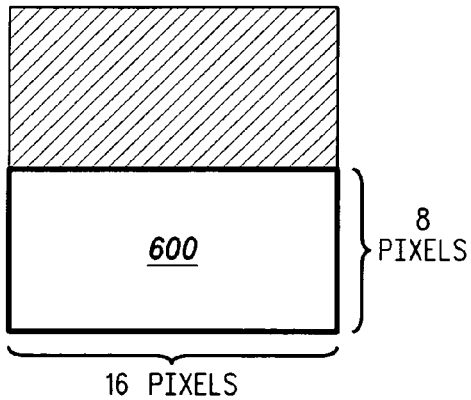
FIG. 6a shows that a macroblock that is encoded in field mode can be divided into a block with a size of 16 by 8 pixels according to an embodiment of the present invention.
Figure 6B:
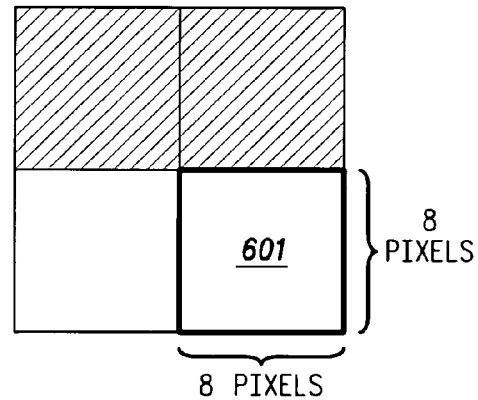
FIG. 6b shows that a macroblock that is encoded in field mode can be divided into a block with a size of 8 by 8 pixels according to an embodiment of the present invention.
Figure 6C:
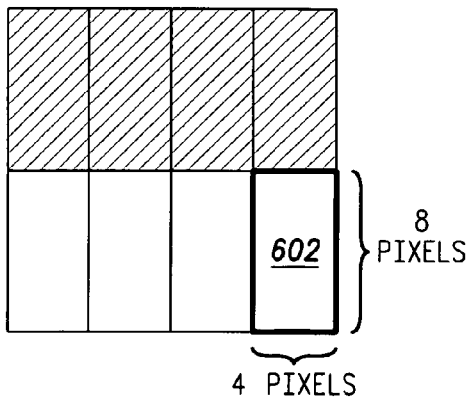
FIG. 6c shows that a macroblock that is encoded in field mode can be divided into a block with a size of 4 by 8 pixels according to an embodiment of the present invention.
Figure 6D:
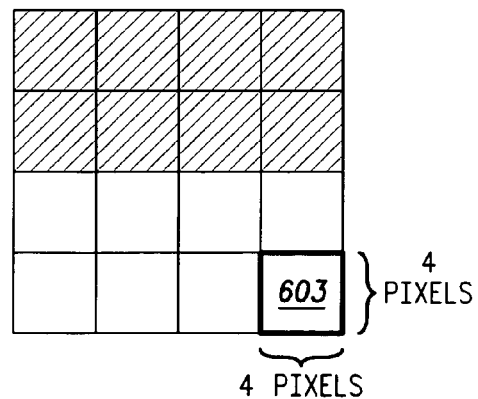
FIG. 6d shows that a macroblock that is encoded in field mode can be divided into a block with a size of 4 by 4 pixels according to an embodiment of the present invention.

As shown in FIGS. 6a-d, a macroblock that is encoded in field mode can be divided into four additional blocks. A block is required to have a single parity. The single parity requirement is that a block cannot comprise both top and bottom fields. Rather, it must contain a single parity of field. Thus, as shown in FIGS. 6a-d, a field mode macroblock can be divided into blocks of 16 by 8 pixels (FIG. 6a; 600), 8 by 8 pixels (FIG. 6b; 601), 4 by 8 pixels (FIG. 6c; 602), and 4 by 4 pixels (FIG. 6d; 603). FIGS. 6a-d shows that each block contains fields of a single parity.

AFF coding on macroblock pairs will now be explained. AFF coding on macroblock pairs will be occasionally referred to as pair based AFF coding. A comparison of the block sizes in FIGS. 6a-d and in FIGS. 3a-f show that a macroblock encoded in field mode can be divided into fewer block patterns than can a macroblock encoded in frame mode. The block sizes of 16 by 16 pixels, 8 by 16 pixels, and 8 by 4 pixels are not available for a macroblock encoded in field mode because of the single parity requirement. This implies that the performance of single macroblock based AFF may not be good for some sequences or applications that strongly favor field mode coding. In order to guarantee the performance of field mode macroblock coding, it is preferable in some applications for macroblocks that are coded in field mode to have the same block sizes as macroblocks that are coded in frame mode. This can be achieved by performing AFF coding on macroblock pairs instead of on single macroblocks.

Figure 7:
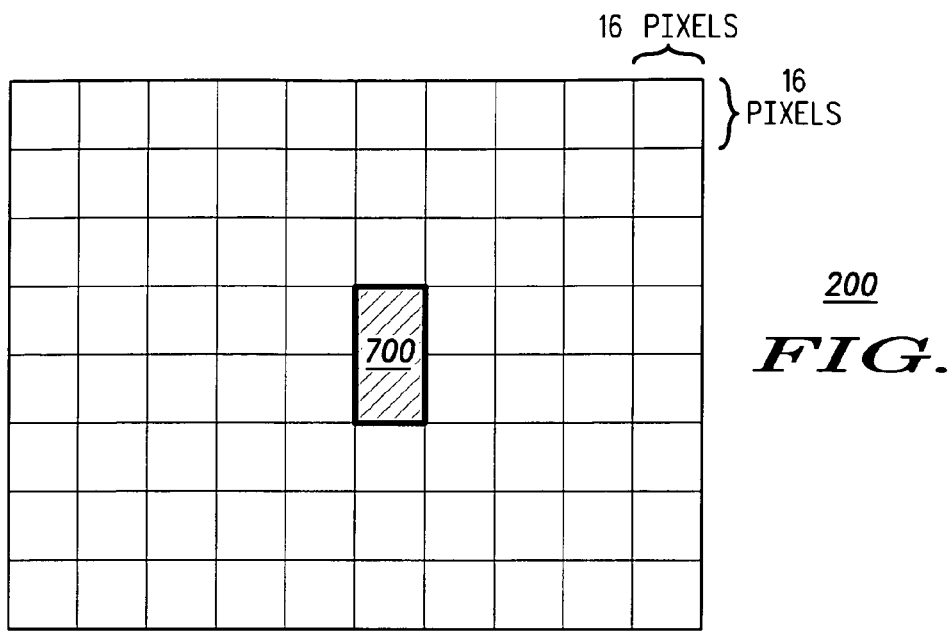
FIG. 7 illustrates an exemplary pair of macroblocks that can be used in AFF coding on a pair of macroblocks according to an embodiment of the present invention.

FIG. 7 illustrates an exemplary pair of macroblocks (700) that can be used in AFF coding on a pair of macroblocks according to an embodiment of the present invention. If the pair of macroblocks (700) is to be encoded in frame mode, the pair is coded as two frame-based macroblocks. In each macroblock, the two fields in each of the macroblocks are encoded jointly. Once encoded as frames, the macroblocks can be further divided into the smaller blocks of FIGS. 3a-f for use in the temporal prediction with motion compensation algorithm.

Figure 8:
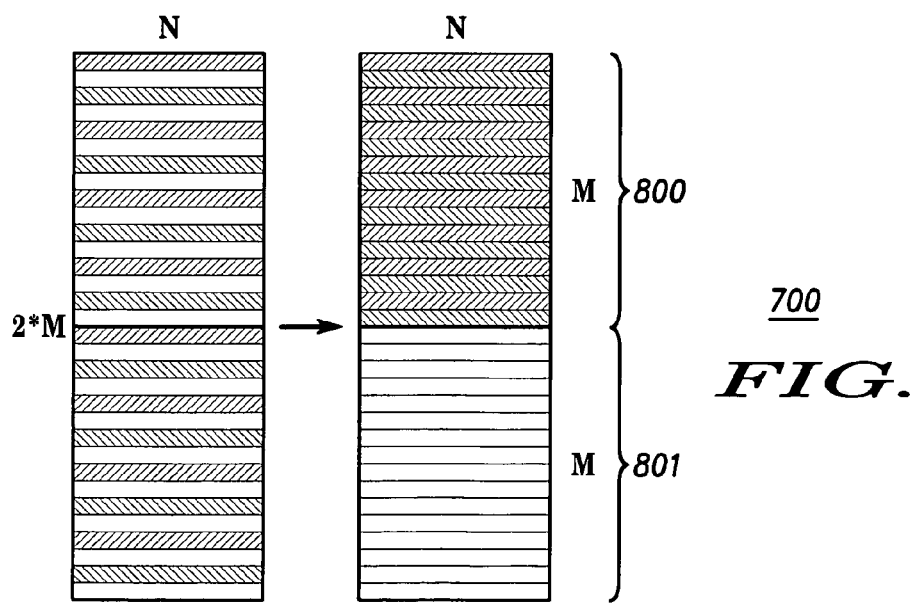
FIG. 8 shows that a pair of macroblocks that is to be encoded in field mode is first split into one top field 16 by 16 pixel block and one bottom field 16 by 16 pixel block.

However, if the pair of macroblocks (700) is to be encoded in field mode, it is first split into one top field 16 by 16 pixel block (800) and one bottom field 16 by 16 pixel block (801), as shown in FIG. 8. The two fields are then coded separately. In FIG. 8, each macroblock in the pair of macroblocks (700) has N=16 columns of pixels and M=16 rows of pixels. Thus, the dimensions of the pair of macroblocks (700) is 16 by 32 pixels. As shown in FIG. 8, every other row of pixels is shaded. The shaded areas represent the rows of pixels in the top field of the macroblocks and the unshaded areas represent the rows of pixels in the bottom field of the macroblocks. The top field block (800) and the bottom field block (801) can now be divided into one of the possible block sizes of FIGS. 3a-f.

Figure 9:
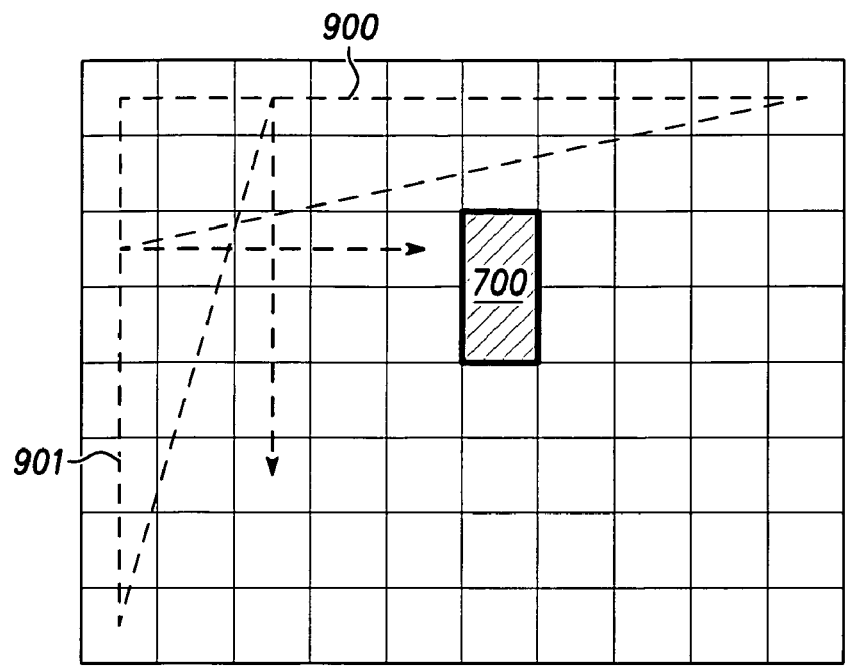
FIG. 9 shows two possible scanning paths in AFF coding of pairs of macroblocks.

According to an embodiment of the present invention, in the AFF coding of pairs of macroblocks (700), there are two possible scanning paths. A scanning path determines the order in which the pairs of macroblocks of a picture are encoded. FIG. 9 shows the two possible scanning paths in AFF coding of pairs of macroblocks (700). One of the scanning paths is a horizontal scanning path (900). In the horizontal scanning path (900), the macroblock pairs (700) of a picture (200) are coded from left to right and from top to bottom, as shown in FIG. 9. The other scanning path is a vertical scanning path (901). In the vertical scanning path (901), the macroblock pairs (700) of a picture (200) are coded from top to bottom and from left to right, as shown in FIG. 9. For frame mode coding, the top macroblock of a macroblock pair (700) is coded first, followed by the bottom macroblock. For field mode coding, the top field macroblock of a macroblock pair is coded first followed by the bottom field macroblock.

Figure 10:
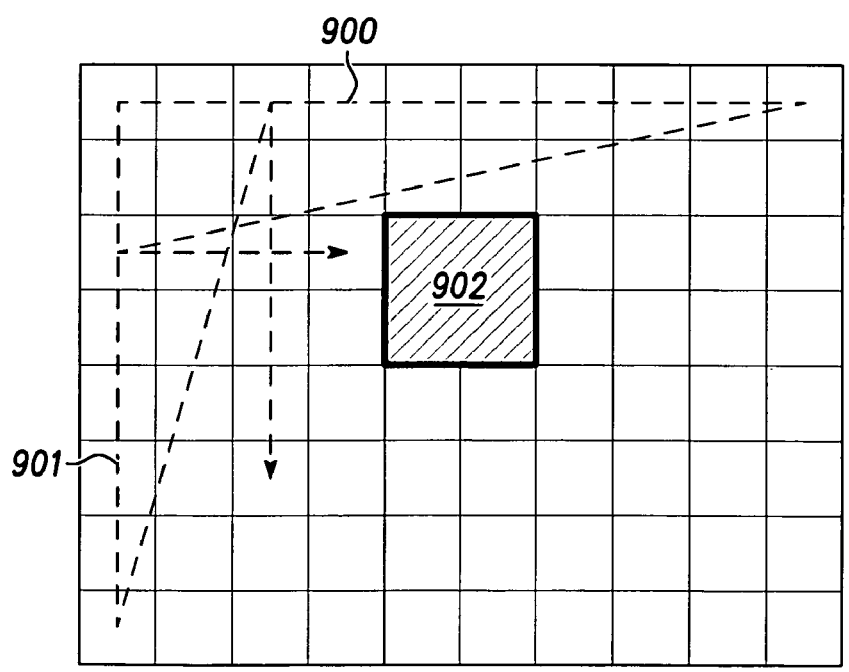
FIG. 10 illustrates another embodiment of the present invention which extends the concept of AFF coding on a pair of macroblocks to AFF coding to a group of four or more neighboring macroblocks.

Another embodiment of the present invention extends the concept of AFF coding on a pair of macroblocks to AFF coding on a group of four or more neighboring macroblocks (902), as shown in FIG. 10. AFF coding on a group of macroblocks will be occasionally referred to as group based AFF coding. The same scanning paths, horizontal (900) and vertical (901), as are used in the scanning of macroblock pairs are used in the scanning of groups of neighboring macroblocks (902). Although the example shown in FIG. 10 shows a group of four macroblocks, the group can be more than four macroblocks.

If the group of macroblocks (902) is to be encoded in frame mode, the group coded as four frame-based macroblocks. In each macroblock, the two fields in each of the macroblocks are encoded jointly. Once encoded as frames, the macroblocks can be further divided into the smaller blocks of FIGS. 3a-f for use in the temporal prediction with motion compensation algorithm.

However, if a group of four macroblocks (902), for example, is to be encoded in field mode, it is first split into one top field 32 by 16 pixel block and one bottom field 32 by 16 pixel block. The two fields are then coded separately. The top field block and the bottom field block can now be divided into macroblocks. Each macroblock is further divided into one of the possible block sizes of FIGS. 3a-f. Because this process is similar to that of FIG. 8, a separate figure is not provided to illustrate this embodiment.

In AFF coding at the macroblock level, a frame/field flag bit is preferably included in a picture's bitstream to indicate which mode, frame mode or field mode, is used in the encoding of each macroblock. The bitstream includes information pertinent to each macroblock within a stream, as shown in FIG. 11. For example, the bitstream can include a picture header (110), run information (111), and macroblock type (113) information. The frame/field flag (112) is preferably included before each macroblock in the bitstream if AFF is performed on each individual macroblock. If the AFF is performed on pairs of macroblocks, the frame/field flag (112) is preferably included before each pair of macroblock in the bitstream. Finally, if the AFF is performed on a group of macroblocks, the frame/field flag (112) is preferably included before each group of macroblocks in the bitstream. One embodiment is that the frame/field flag (112) bit is a 0 if frame mode is to be used and a 1 if field coding is to be used. Another embodiment is that the frame/field flag (112) bit is a 1 if frame mode is to be used and a 0 if field coding is to be used.

Another embodiment of the present invention entails a method of determining the size of blocks into which the encoder divides a macroblock in macroblock level AFF. A preferable, but not exclusive, method for determining the ideal block size is sum absolute difference (SAD) with or without bias or rate distortion (RD) basis. For example, SAD checks the performance of the possible block sizes and chooses the ideal block size based on its results. The exact method of using SAD with or without bias or RD basis can be easily be performed by someone skilled in the art.

According to an embodiment of the present invention, each frame and field based macroblock in macroblock level AFF can be intra coded or inter coded. In intra coding, the macroblock is encoded without temporally referring to other macroblocks. On the other hand, in inter coding, temporal prediction with motion compensation is used to code the macroblocks.

If inter coding is used, a block with a size of 16 by 16 pixels, 16 by 8 pixels, 8 by 16 pixels, or 8 by 8 pixels can have its own reference pictures. The block can either be a frame or field based macroblock. The MPEG-4 Part 10 AVC/H.264 standard allows multiple reference pictures instead of just two reference pictures. The use of multiple reference pictures improves the performance of the temporal prediction with motion compensation algorithm by allowing the encoder to find a block in the reference picture that most closely matches the block that is to be encoded. By using the block in the reference picture in the coding process that most closely matches the block that is to be encoded, the greatest amount of compression is possible in the encoding of the picture. The reference pictures are stored in frame and field buffers and are assigned reference frame numbers and reference field numbers based on the temporal distance they are away from the current picture that is being encoded. The closer the reference picture is to the current picture that is being stored, the more likely the reference picture will be selected. For field mode coding, the reference pictures for a block can be any top or bottom field of any of the reference pictures in the reference frame or field buffers.

Each block in a frame or field based macroblock can have its own motion vectors. The motion vectors are spatially predictive coded. According to an embodiment of the present invention, in inter coding, prediction motion vectors (PMV) are also calculated for each block. The algebraic difference between a block's PMVs and its associated motion vectors is then calculated and encoded. This generates the compressed bits for motion vectors.

FIG. 12 will be used to explain various preferable methods of calculating the PMV of a block in a macroblock. A current block, E, in FIG. 12 is to be inter coded as well as its neighboring blocks A, B, C, and D. E will refer hereafter to a current block and A, B, C, and D will refer hereafter to E's neighboring blocks, unless otherwise denoted. Block E's PMV is derived from the motion vectors of its neighboring blocks. These neighboring blocks in the example of FIG. 12 are A, B, C, and D. One preferable method of calculating the PMV for block E is to calculate either the median of the motion vectors of blocks A, B, C, and D, the average of these motion vectors, or the weighted average of these motion vectors. Each of the blocks A through E can be in either frame or field mode.

Another preferable method of calculating the PMV for block E is to use a yes/no method. Under the principles of the yes/no method, a block has to be in the same frame or field coding mode as block E in order to have its motion vector included in the calculation of the PMV for E. For example, if block E in FIG. 12 is in frame mode, block A must also be in frame mode to have its motion vector included in the calculation of the PMV for block E. If one of E's neighboring blocks does not have the same coding mode as does block E, its motion vectors are not used in the calculation of block E's PMV.

The "always method" can also be used to calculate the PMV for block E. In the always method, blocks A, B, C, and D are always used in calculating the PMV for block E, regardless of their frame or field coding mode. If E is in frame mode and a neighboring block is in field mode, the vertical component of the neighboring block is multiplied by 2 before being included in the PMV calculation for block E. If E is in field mode and a neighboring block is in frame mode, the vertical component of the neighboring block is divided by 2 before being included in the PMV calculation for block E.

The "selective method" can also be used to calculate the PMV for block E if the macroblock has been encoded using pair based AFF encoding or group based AFF encoding. In the selective method, a frame-based block has a frame-based motion vector pointing to a reference frame. The block is also assigned a field-based motion vector pointing to a reference field. The field-based motion vector is the frame-based motion vector of the block with the vertical motion vector component divided by two. The reference field number is the reference frame number multiplied by two. A field-based block has a field-based motion vector pointing to a reference field. The block is also assigned a frame-based motion vector pointing to a reference frame. The frame-based motion vector is the field-based motion vector of the block with the vertical motion vector component multiplied by two. The reference frame number is the reference field number divided by two.

The derivation of a block's PMV using the selective method will now be explained using FIG. 12 as a reference. In macroblock pair based AFF, each block in a macroblock is associated with a companion block that resides in the same geometric location within the second macroblock of the macroblock pair. In FIG. 12, each of block E's neighboring blocks (A, B, C, and D) may or may not be in the same frame or field coding mode as block E. Hence, the following rules apply:

If E is in frame mode and a neighboring block is in frame mode, the true frame-based motion vector of the neighboring block is used for E's PMV.

If E is in frame mode and a neighboring block is in field mode, the following rules apply in calculating E's PMV. If the neighboring block (e.g.; block A) and its companion field-based block have the same reference field, the avenge of the assigned frame-based motion vectors of the two blocks is used for the calculation of E's PMV. The reference frame number used for the PMV calculation is the reference field number of the neighboring block divided by two. However, if the neighboring block and its companion field block have different reference fields, then the neighboring block cannot be used in the calculation of E's PMV.

If E is in field mode and a neighboring block is in frame mode, the following rules apply in calculating E's PMV. If the neighboring block (e.g.; block A) and its companion frame-based block have the same reference frame, the average of the assigned field-based motion vectors of the two blocks is used for the calculation of E's PMV. The reference field number used for the PMV calculation is the reference frame number of the neighboring block multiplied by two. However, if the neighboring block and its companion field block have different reference frames, then the neighboring block cannot be used in the calculation of E's PMV.

If E is in field mode and a neighboring block is in field mode, the true field-based motion vector of the neighboring block is used in the calculation of E's PMV.

An alternate preferable option can be used in the selective method to calculate a block's PMV. In FIG. 12, each of block E's neighboring blocks (A, B, C, and D) may or may not be in the same frame or field coding mode as block E. Hence, the following rules apply for this alternate preferable option of the selective method:

If E is in frame mode and a neighboring block is in frame mode, the true frame-based motion vector of the neighboring block is used for E's PMV.

If E is in frame mode and a neighboring block is in field mode, the weighted average of the assigned frame-based motion vectors of the neighboring block and its companion field-based block is used for the calculation of E's PMV. The weighting factors are based upon the reference field numbers of the neighboring block and its companion block.

If E is in field mode, and a neighboring block is in frame mode, the weighted average of the assigned field-based motion vectors of the neighboring block and its companion frame-based block is used for the calculation of E's PMV. The weighting factors are based upon the reference frame numbers of the neighboring block and its companion block.

If E is in field mode and a neighboring block is in field mode, the true field-based motion vector of the neighboring block is used in the calculation of E's PMV.

Another preferable method of computing a block's PMV is the "alt selective method." This method can be used in single macroblock AFF coding, pair based macroblock AFF coding, or group based AFF coding. In this method, each block is assigned a horizontal and a vertical index number, which represents the horizontal and vertical coordinates of the block. Each block is also assigned a horizontal and vertical field coordinate. A block's horizontal field coordinate is same as its horizontal coordinate. For a block in a top field macroblock, the vertical field coordinate is half of vertical coordinate of the block and is assigned top field polarity. For a block in the bottom field macroblock, the vertical field coordinate of the block is obtained by subtracting 4 from the vertical coordinate of the block and dividing the result by 2. The block is also assigned bottom field polarity. The result of assigning different field polarities to two blocks is that there are now two blocks with the same horizontal and vertical field coordinates but with differing field polarities. Thus, given the coordinates of a block, the field coordinates and its field polarity can be computed and vice versa.

The alt selective method will now be explained in detail using FIG. 12 as a reference. The PMV of block E is to be computed. Let bx represent the horizontal size of block E divided by 4, which is the size of a block in this example. The PMVs for E are obtained as follows depending on whether E is in frame/field mode.

Now, let block E be in top or bottom field mode and let (xf,yf) represent the horizontal and vertical field coordinates respectively of E. In this case, the neighbors of E are defined as follows. A is the block whose field coordinates are (xf−1, yf) and has same polarity as E. B is the block whose field coordinates are (xf,yf−1) and has same polarity as E. D is the block whose field coordinates are (xf−1,yf−1) and has same polarity as B. C is the block whose field coordinates are (xf+bx+1,yf) and has same polarity as E. If either A,B,C or D is in frame mode then its vertical motion vector is divided by 2 before being used for prediction and its reference field is computed by multiplying its reference frame by 2.

In all of the above methods for determining the PMV of a block, a horizontal scanning path was assumed. However, the scanning path can also be a vertical scanning path. In this case, the neighboring blocks of the current block, E, are defined as shown in FIG. 13. A vertical scanning path is preferable in some applications because the information on all the neighboring blocks is available for the calculation of the PMV for the current block E.

Another embodiment of the present invention is directional segmentation prediction. In directional segmentation prediction, 16 by 8 pixel blocks and 8 by 16 pixel blocks have rules that apply to their PMV calculations only. These rules apply in all PMV calculation methods for these block sizes. The rules will now be explained in detail in connection with FIG. 12. In each of these rules, a current block E is to have its PMV calculated.

First, a 16 by 16 pixel black consists of an upper block and a lower block. The upper block contains the top 8 rows of 16 pixels. The lower block contains the bottom 8 rows of 16 pixels. In the following description, block E of FIG. 12 is a 16 by 8 pixel block. For the upper block having a 16 by 8 pixel block, block B is used to predict block E's PMV if it has the same reference picture as block E. Otherwise, median prediction is used to predict block E's PMV. For the lower block having a 16 by 8 pixel block, block A is used to predict block E's PMV if it has the same reference picture as block E. Otherwise, median prediction is used to predict block E's PMV.

A 16 by 16 pixel block is divided into a right and left block. Both right and left blocks are 8 by 16 pixels. In the following description, block E of FIG. 12 is a 8 by 16 pixel block. For the left block, block A is used to predict block E's PMV if it has the same reference picture as block E. Otherwise, median prediction is used to predict block E's PMV. For the right block, block C is used to predict block E's PMV if it has the same referenced picture as block E. Otherwise median prediction is used to predict block E's PMV.

For both 16 by 8 pixel blocks and 8 by 16 blocks, A, B, or C can be in different encoding modes (frame or field) than the current block E. The following rules apply for both block sizes. If E is in frame mode, and A, B, or C is in field mode, the reference frame number of A, B, or C is computed by dividing its reference field by 2. If E is in field mode, and A, B, or C is in frame mode, the reference field number of A, B, or C is computed by multiplying its reference frame by 2.

According to another embodiment of the present invention, a macroblock in a P picture can be skipped in AFF coding. If a macroblock is skipped, its data is not transmitted in the encoding of the picture. A skipped macroblock in a P picture is reconstructed by copying the co-located macroblock in the most recently coded reference picture. The co-located macroblock is defined as the one with motion compensation using PMV as defined above or without motion vectors. The following rules apply for skipped macroblocks in a P picture. If AFF coding is performed per macroblock, a skipped macroblock is in frame mode. If AFF coding is performed on macroblock pairs and if both macroblocks are skipped, then they are in frame mode. However, if only one of the macroblocks in a macroblock pair is skipped, its frame or field coding mode is the same as the non-skipped macroblock in the same macroblock pair. If AFF coding is performed on a group of macroblocks and if the entire group of macroblocks is skipped, then all the macroblocks are in frame mode. If there is at least one macroblock that is not skipped, then the skipped macroblocks in the same group are in the same frame or field coding mode as the non-skipped macroblock.

An alternate method for skipped macroblocks is as follows. If a macroblock pair is skipped, its frame and field coding mode follows its neighboring macroblock pair to the left. If the left neighboring macroblock pair is not available, its coding mode follows its neighboring macroblock pair to the top. If neither the left nor top neighboring macroblock pairs are available, the skipped macroblock is set to frame mode.

Another embodiment of the present invention is direct mode macroblock coding for B pictures. In direct mode coding, a B picture has two motion vectors, forward and backward motion vectors. Each motion vector points to a reference picture. Both the forward and backward motion vectors can point in the same temporal direction. For direct mode macroblock coding in B pictures, the forward and backward motion vectors of a block are calculated from the co-located block in the backward reference picture. The co-located block in the backward reference picture can be frame mode or field mode coded. The following rules apply in direct mode macroblock coding for B picture.

If the co-located block is in frame mode and if the current direct mode macroblock is also in frame mode, the two associated motion vectors of a block in the direct mode macroblock are calculated from the co-located block. The forward reference frame is the one used by the co-located block. The backward reference frame is the same frame where the co-located block resides.

If the co-located block is in frame mode and if the current direct mode macroblock is in field mode, the two associated motion vectors of a block in the direct mode macroblock are calculated from the co-located block's motion vector with vertical component divided by two. The forward reference field is the same parity field of the reference frame used by the co-located block. The backward reference field is the same parity field of the backward reference frame where the co-located block resides.

If the co-located block is in field mode and if the current direct mode macroblock is also in field mode, the two associated motion vectors of a block in the direct mode macroblock are calculated from the co-located block of the same field parity. The forward reference field is the field used by the co-located block. The backward reference field is the same field where the co-located block resides.

If the co-located block is in field mode and if the current direct mode macroblock is in frame mode, the two associated motion vectors of the block in the direct mode macroblock are calculated from the co-located block's motion vector with vertical component multiplied by two. The forward reference frame is the frame one of whose fields is used by the co-located block. The backward reference field is the frame in one of whose fields the co-located block resides.

An alternate option is to force the direct mode block to be in the same frame or field coding mode as the co-located block. In this case, if the co-located block for a direct mode block is in frame mode, the direct mode block is in frame mode as well. The two frame-based motion vectors of the direct mode block are derived from the frame-based forward motion vector of the co-located block. The forward reference frame is used by the co-located block. The backward reference frame is where the co-located block resides.

However, if the co-located block for a block in direct mode is in field mode, the direct mode block is also in field mode. The two field-based motion vectors of the direct mode block are derived from the field-based forward motion vector of the co-located block. The forward reference field is used by the co-located block. The backward reference field is where the co-located block resides.

A macroblock in a B picture can also be skipped in AFF coding according to another embodiment of the present invention. A skipped macroblock in a B picture is reconstructed as a regular direct mode macroblock without any coded transform coefficient information. For skipped macroblocks in a B picture, the following rules apply. If AFF coding is performed per macroblock, a skipped macroblock is either in frame mode or in the frame or field coding mode of the co-located block in its backward reference picture. If AFF coding is performed on macroblock pairs and if both macroblocks are skipped, then they are in frame mode or in the frame or field coding mode of the co-located macroblock pair in the its backward reference picture. However, if only one of the macroblocks in a macroblock pair is skipped, its frame or field coding mode is the same as the non-skipped macroblock of the same macroblock pair. If AFF coding is performed on a group of macroblocks and if the entire group of macroblocks is skipped, then all the macroblocks are in frame mode or in the frame or field coding mode of the co-located group of macroblocks in the backward reference picture. If there is at least one macroblock that is not skipped, then the skipped macroblock in the same group are in the same frame or field coding mode as the non-skipped macroblock.

As previously mentioned, a block can be intra coded. Intra blocks are spatially predictive coded. There are two possible intra coding modes for a macroblock in macroblock level AFF coding. The first is intra_4×4 mode and the second is intra_16×16 mode. In both, each pixel's value is predicted using the real reconstructed pixel values from neighboring blocks. By predicting pixel values, more compression can be achieved. The intra_4×4 mode and the intra_16×16 modes will each be explained in more detail below.

For intra_4×4 mode, the predictions of the pixels in a 4 by 4 pixel block, as shown in FIG. 14, are derived form its left and above pixels. In FIG. 14, the 16 pixels in the 4 by 4 pixel block are labeled a through p. Also shown in FIG. 14 are the neighboring pixels A through P. The neighboring pixels are in capital letters. As shown in FIG. 15, there are nine different prediction directions for intra_4×4 coding. They are vertical (0), horizontal (1), DC prediction (mode 2), diagonal down/left (3), diagonal down/right (4), vertical-left (5), horizontal-down (6), vertical-right (7), and horizontal-up (8). DC prediction averages all the neighboring pixels together to predict a particular pixel value.

However, for intra_16×1 6 mode, there are four different prediction directions. Prediction directions are also referred to as prediction modes. These prediction directions are vertical prediction (0), horizontal prediction (1), DC prediction, and plane prediction. Plane prediction will not be explained.

An intra block and its neighboring blocks may be coded in frame or field mode. Intra prediction is performed on the reconstructed blocks. A reconstructed block can be represented in both frame and field mode, regardless of the actual frame or field coding mode of the block. Since only the pixels of the reconstructed blocks are used for intra prediction, the following rules apply.

If a block of 4 by 4 pixels or 16 by 16 pixels is in frame mode, the neighboring pixels used in calculating the pixel value predictions of the block are in the frame structure. If a block of 4 by 4 pixels or 16 by 16 pixels is in field mode, the neighboring pixels used in calculating the pixel value prediction of the block are in field structure of the same field parity.

The chosen intra-prediction mode (intra_pred_mode) of a 4 by 4 pixel block is highly correlated with the prediction modes of adjacent blocks. This is illustrated in FIG. 16a. FIG. 16a shows that A and B are adjacent blocks to C. Block C's prediction mode is to be established. FIG. 16b shows the order of intra prediction information in the bitstream. When the prediction modes of A and B are known (including the case that A or B or both are outside the slice) the most probable prediction mode (most_probable_mode) of C is given. If one of the blocks A or B is "outside" the most probable prediction mode is equal DC prediction (mode 2). Otherwise it is equal to the minimum of prediction modes used for blocks A and B. When an adjacent block is coded by 16×16 intra mode, prediction mode is DC prediction mode. When an adjacent block is coded a non-intra macroblock, prediction mode is "mode 2: DC prediction" in the usual case and "outside" in the case of constrained intra update.

To signal a prediction mode number for a 4 by 4 block first parameter use_most_probable_mode is transmitted. This parameter is represented by 1 bit codeword and can take values 0 or 1. If use_most_probable_mode is equal to 1 the most probable mode is used. Otherwise an additional parameter remaining_mode_selector, which can take value from 0 to 7 is sent as 3 bit codeword. The codeword is a binary representation of remaining_mode_selector value. The prediction mode number is calculated as:

if (remaining_mode_selector<most_probable_mode)

intra_pred_mode=remaining_mode_selector;

else intra_pred_mode=remaining_mode_selector+1;

The ordering of prediction modes assigned to blocks C is therefore the most probable mode followed by the remaining modes in the ascending order.

An embodiment of the present invention includes the following rules that apply to intra mode prediction for an intra-prediction mode of a 4 by 4 pixel block or an intra-prediction mode of a 16 by 16 pixel block. Block C and its neighboring blocks A and B can be in frame or field mode. One of the following rules shall apply. FIGS. 16a-b will be used in the following explanations of the rules.

Rule 1: A or B is used as the neighboring block of C only if A or B is in the same frame/field mode as C. Otherwise, A or B is considered as outside.

Rule 2: A and B are used as the neighboring blocks of C, regardless of their frame/field coding mode.

Rule 3: If C is coded in frame mode and has co-ordinates (x,y), then A is the block with co-ordinates (x,y−1) and B is the block with co-ordinates (x−1,y). Otherwise, if C is coded as field and has field co-ordinates (xf,yf) then A is the block whose field co-ordinates are (xf,yf−1) and has same field polarity as C and B is the block whose field co-ordinates are (xf−1,yf) and has same field polarity as C.

Rule 4: This rule applies to macroblock pairs only. In the case of decoding the prediction modes of blocks numbered 3, 6, 7, 9, 12, 13, 11, 14 and 15 of FIG. 16b, the above and the left neighboring blocks are in the same macroblock as the current block. However, in the case of decoding the prediction modes of blocks numbered 1, 4, and 5, the top block (block A) is in a different macroblock pair than the current macroblock pair. In the case of decoding the prediction mode of blocks numbered 2, 8, and 10, the left block (block B) is in a different macroblock pair. In the case of decoding the prediction mode of the block numbered 0, both the left and the above blocks are in different macroblock pairs. For a macroblock in field decoding mode the neighboring blocks of the blocks numbered 0, 1, 4, 5, 2, 8, and 10 shall be defined as follows:

If the above macroblock pair (170) is decoded in field mode, then for blocks number 0, 1, 4 and 5 in the top-field macroblock (173), blocks numbered 10, 11, 14 and 15 respectively in the top-field macroblock (173) of the above macroblock pair (170) shall be considered as the above neighboring blocks to the current macroblock pair (171) as shown in FIG. 17a. For blocks number 0, 1, 4 and 5 in the bottom-field macroblock (174), blocks numbered 10, 11, 14 and 15 respectively in the bottom-field MB of the above macroblock pair (170) shall be considered as the above neighboring blocks to the current macroblock pair (171), as shown in FIG. 17a.

However, if the above macroblock pair (170) is decoded in frame mode then for blocks number 0, 1, 4 and 5 in the top-field macroblock (173), blocks numbered 10, 11, 14 and 15 respectively in the bottom-frame macroblock (176) of the above macroblock pair (170) shall be considered as the above neighboring blocks to the current macroblock pair (171), as shown in FIG. 17b. For blocks number 0, 1, 4 and 5 in the bottom-field macroblock (174), blocks numbered 10, 11, 14 and 15 respectively in the bottom-frame macroblock (176) of the above macroblock pair (170) shall be considered as the above neighboring blocks to the current macroblock pair (171), as shown inn FIG. 17b.

Figure 17C:
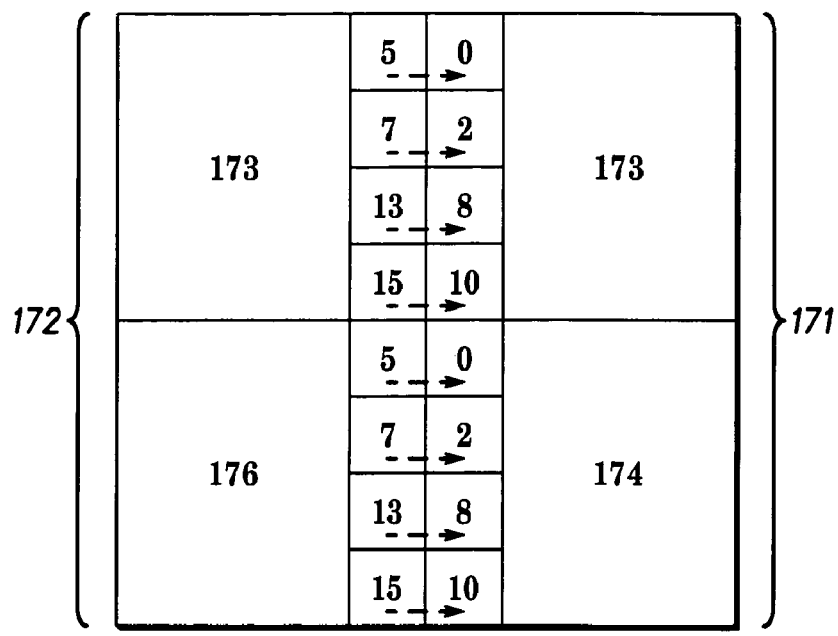

If the left macroblock pair (172) is decoded in field mode, then for blocks number 0, 2, 8 and 10 in the top-field macroblock (173), blocks numbered 5, 7, 13 and 15 respectively in the top-field macroblock (173) of the left macroblock pair (172) shall be considered as the left neighboring blocks to the current macroblock pair (171) as shown in FIG. 17c. For blocks number 0, 2, 8 and 10 in the bottom-field macroblock (174), blocks numbered 5, 7, 13 and 15 respectively in the bottom-field macroblock (174) of the left macroblock pair (172) shall be considered as the left neighboring blocks to the current macroblock pair (171), as shown in FIG. 17c.

Figure 17D:
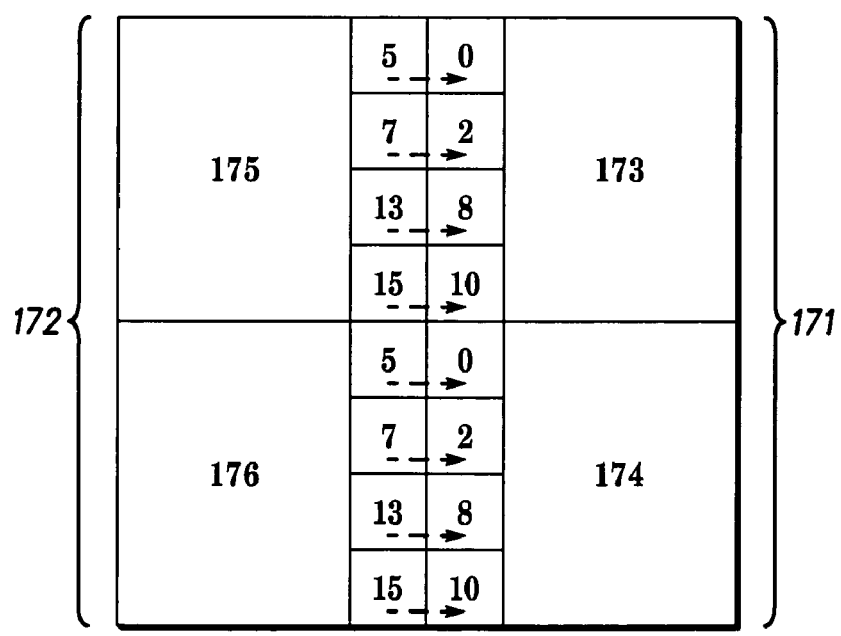

If the left macroblock pair (172) is decoded in frame mode, then for blocks number 0, 2, 8 and 10 in the top-field macroblock (173), the blocks numbered 5, 7, 13 and 15 respectively in the top-frame macroblock (175) of the left macroblock pair (172) shall be considered as the left neighboring blocks to the current macroblock pair (171), as shown in FIG. 17d. For blocks number 0, 2, 8 and 10 in the bottom-field macroblock (174), blocks numbered 5, 7, 13 and 15 respectively in the bottom-frame macroblock (176) of the left macroblock pair (172) shall be considered as the left neighboring blocks to the current macroblock pair (171), as shown in FIG. 17d.

For macroblock pairs on the upper boundary of a slice, if the left macroblock pair (172) is in frame decoding mode, then the intra mode prediction value used to predict a field macroblock shall be set to DC prediction.

The preceding descriptions of intra coding and intra mode prediction can be extended to adaptive block transforms.

Another embodiment of the present invention is tat loop filtering is performed on the reconstructed blocks. A reconstructed block can be represented in either frame or field structure, regardless of the frame/field coding mode of the block. Loop (deblock) filtering is a process of weighted averaging of the pixels of the neighboring blocks. FIG. 12 will be used to explain loop filtering. Assume E of FIG. 12 is a reconstructed block, and A, B, C and D are its neighboring reconstructed blocks, as shown in FIG. 12, and they are all represented in frame structure. Since A, B, C, D and E can be either frame- or field-coded, the following rules apply:

Rule 1: If E is frame-coded, loop filtering is performed over the pixels of E and its neighboring blocks A B, C and D.

Rule 2: If E is field-coded, loop filtering is performed over the top-field and bottom-field pixels of E and its neighboring blocks A B, C and D, separately.

Another embodiment of the present invention is that padding is performed on the reconstructed frame by repeating the boundary pixels. Since the boundary blocks may be coded in frame or field mode, the following rules apply:

Rule 1: The pixels on the left or right vertical line of a boundary block are repeated, if necessary.

Rule 2: If a boundary block is in frame coding, the pixels on the top or bottom horizontal line of the boundary block are repeated.

Rule 3: if a boundary block is in field coding, the pixels on the two top or two bottom horizontal (two field) lines of the boundary block are repeated alternatively.

Another embodiment of the present invention is that two-dimensional transform coefficients are converted into one-dimensional series of coefficients before entropy coding. The scan path can be either zigzag or non-zigzag. The zigzag scanner is preferably for progressive sequences, but it may be also used for interlace sequences with slow motions. The non-zigzag scanners are preferably for interlace sequences.

For macroblock AFF coding, the following options may be used:

Option 1: The zigzag scan is used for macroblocks in frame mode while the non-zigzag scanners are used for macroblocks in field coding.

Option 2: The zigzag scan is used for macroblocks in both frame and field modes.

Option 3: The non-zigzag scan is used for macroblocks in both frame and field modes.

The preceding description has been presented only to illustrate and describe embodiments of invention. It is not intended to be exhaustive or to limit the invention to any precise form disclosed. Many modifications and variations are possible in light of the above teaching.

The foregoing embodiments were chosen and described in order to illustrate principles of the invention and some practical applications. The preceding description enables others skilled in the art to utilize the invention in various embodiments and with various modifications as are suited to the particular use contemplated. It is intended that the scope of the invention be defined by the following claims.

What is claimed is:

1. A method of encoding a picture in an image sequence, comprising:
    dividing said picture into a plurality of smaller portions;
    selecting at least one of said plurality of smaller portions at a time in frame coding mode and at least one of said plurality of smaller portions at a time in field coding mode;
    encoding the selected at least one smaller portions, including deriving at least two motion vectors and two associated reference pictures or fields pointed by said two motion vectors for at least one current block of said at least one smaller portion of said plurality of smaller portions if said picture is a bi-predictive coded picture,
    wherein each of said smaller portions has a size that is a multiple of more than one macroblock, and
    wherein each current block of said at least one current block of said at least one smaller portion has a size smaller than said smaller portion of at least one of said plurality of smaller portions.

2. The method of claim 1, wherein said at least two motion vectors are computed from a co-located block in one of said two associated reference pictures or fields.

3. An apparatus for encoding a picture in an image sequence, comprising:
    means for dividing said picture into a plurality of smaller portions;
    means for selecting at least one of said plurality of smaller portions at a time in frame coding mode and at least one of said plurality of smaller portions at a time in field coding mode; and
    means for encoding the selected at least one smaller portions, including deriving at least two motion vectors and two associated reference pictures or fields pointed by said two motion vectors for at least one current block of said at least one smaller portion of said plurality of smaller portions if said picture is a bi-predictive coded picture,
    wherein each of said smaller portions has a size that is a multiple of more than one macroblock, and
    wherein each current block of said at least one current block of said at least one smaller portion has a size smaller than said smaller portion of at least one of said plurality of smaller portions.

4. The apparatus of claim 3, wherein said at least two motion vectors are computed from a co-located block in one of said two associated reference pictures or fields.

5. A method of decoding an encoded picture having a plurality of smaller portions from a bitstream, comprising:
    receiving at least one of a plurality of smaller portions at a time in frame coding mode and at least one of said plurality of smaller portions at a time in field coding mode;
    decoding the received at least one plurality of smaller portions, including deriving at least two motion vectors and two associated reference pictures or fields for at least one current block of a smaller portion of said plurality of smaller portions if said picture is a bi-predictive coded picture; and
    using said plurality of decoded smaller portions and said at least two motion vectors for at least one current block of said smaller portion of said plurality of smaller portions to construct a decoded picture,
    wherein each of said smaller portions has a size that is a multiple of more than one macroblock, and
    wherein each current block of said at least one current block of said at least one smaller portion has a size smaller than said smaller portion of at least one of said plurality of smaller portions.

6. The method of claim 5, wherein said at least two motion vectors are computed from a co-located block in one of said two associated reference pictures or fields.

7. The method of claim 6, wherein said co-located block in one of said two associated reference pictures or fields is encoding in said frame coding mode or said field coding mode.

8. The method of claim 5, wherein said at least two reference pictures or fields are deriving from a co-located block.

9. An apparatus of decoding an encoded picture having a plurality of smaller portions from a bitstream, comprising:
    means for receiving at least one of a plurality of smaller portions at a time in frame coding mode and at least one of said plurality of smaller portions at a time in field coding mode;
    means for decoding the received at least one plurality of smaller portions, including deriving at least two motion vectors and two associated reference pictures or fields for at least one current block of a smaller portion of said plurality of smaller portions if said picture is a bi-predictive coded picture; and
    means for using said plurality of decoded smaller portions and said at least two motion vectors for at least one current block of said smaller portion of said plurality of smaller portions to construct a decoded picture,
    wherein each of said smaller portions has a size that is a multiple of more than one macroblock, and
    wherein each current block of said at least one current block of said at least one smaller portion has a size smaller than said smaller portion of at least one of said plurality of smaller portions.

10. The apparatus of claim 9, wherein said at least two motion vectors are computed from a co-located block in one of said two associated reference pictures or fields.

11. The apparatus of claim 10, wherein said co-located block in one of said two associated reference pictures or fields is encoding in said frame coding mode or said field coding mode.

12. The apparatus of claim 9, wherein said at least two reference pictures or fields are deriving from a co-located block.

* * * * *